US012569794B2

(12) United States Patent
Gregerson et al.

(10) Patent No.: US 12,569,794 B2
(45) Date of Patent: Mar. 10, 2026

(54) COLLAPSIBLE AIR FILTER AND ASSOCIATED PACKAGING

(71) Applicant: 3M INNOVATIVE PROPERTIES COMPANY, St. Paul, MN (US)

(72) Inventors: Glen O. Gregerson, Hudson, WI (US); Mark A. Sanocki, Vadnais Heights, MN (US); Riley J. Hillstrom, Hudson, WI (US); Laszlo Titkos, Shoreview, MN (US); Fernando J. Viso, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 383 days.

(21) Appl. No.: 18/178,057

(22) Filed: Mar. 3, 2023

(65) Prior Publication Data

US 2023/0277971 A1 Sep. 7, 2023

Related U.S. Application Data

(60) Provisional application No. 63/316,531, filed on Mar. 4, 2022.

(51) Int. Cl.
B01D 46/00 (2022.01)
B01D 46/52 (2006.01)

(52) U.S. Cl.
CPC ....... B01D 46/0016 (2013.01); B01D 46/521 (2013.01); B01D 2275/203 (2013.01)

(58) Field of Classification Search
CPC .............. B01D 16/0016; B01D 46/521; B01D 2275/203; B01D 2279/50; B01D 46/10
See application file for complete search history.

(56) References Cited

U.S. PATENT DOCUMENTS

| | | | |
|---|---|---|---|
| 6,740,137 B2 | 5/2004 | Kubokawa et al. | |
| 7,622,063 B2 | 11/2009 | Sundet et al. | |
| 7,858,163 B2 | 12/2010 | Angadjivand et al. | |
| 7,947,142 B2 | 5/2011 | Fox et al. | |
| 8,157,881 B1 | 4/2012 | Anoszko et al. | |
| 8,162,153 B2 | 4/2012 | Fox et al. | |
| 9,320,998 B2 | 4/2016 | Gillilan | |
| 10,427,079 B2 | 10/2019 | Barry et al. | |
| 10,512,872 B2 | 12/2019 | Williams et al. | |
| 2015/0267927 A1* | 9/2015 | Zhang | B01D 46/521 |
| | | | 55/497 |
| 2021/0229022 A1 | 7/2021 | Zhang et al. | |
| 2021/0229023 A1 | 7/2021 | Lise et al. | |

* cited by examiner

*Primary Examiner* — Thuan D Dang

(57) ABSTRACT

The present disclosure generally relates to air filters expandable from a collapsed arrangement to an expanded, end-use arrangement and to methods of making, using, and installing such air filters. Some embodiments relate to an air filter having an expanded state and a collapsed state. The air filter includes a filter media assembly including (1) filter media including a plurality of pleats, (2) first and second opposing sides, and (3) first and second opposing ends. The air filter also includes a shape retention structure capable of being connected to at least a portion of the filter media assembly and capable of retention the filter media assembly in the expanded state. A spacing distance between adjacent pleats in the filter media is greater in the expanded state of the air filter than in the collapsed state of the air filter. In some embodiments, the air filter is an HVAC air filter.

19 Claims, 15 Drawing Sheets

COLLAPSIBLE AIR FILTER AND ASSOCIATED PACKAGING

TECHNICAL FIELD

The present disclosure relates to air filters and methods of using and installing those air filters. More particularly, it relates to air filters expandable from a collapsed arrangement to an expanded, end-use arrangement.

BACKGROUND

Disposable air filters are commonly used in forced air systems (e.g., residential heating and air-conditioning systems) in order to remove dust and dirt particles and the like. Heating, ventilation, and air conditioning ("HVAC") air filters typically include a filter media surrounded and supported by a frame. Additional supporting and/or reinforcing components, such as a mesh screen, adhesive beads, etc., may also be included. After a period of use, the filter media becomes dirty or clogged (e.g., loaded with captured particulates), and must be replaced. This is accomplished by replacing the entire air filter. Because the frame (and other reinforcing components where provided) is discarded with the air filter even though it is only the filter media that is no longer functional, there may be unnecessary waste and cost associated with conventional HVAC air filters.

In addition to supporting the filter media, the frame defines a perimeter size and shape of the HVAC air filter, and is normally selected to match the size and shape of the expected end-use application. For example, many residential HVAC systems are configured for use with a "standard" sized air filter of 20"×20"×1" or 20"×25"×1". The rigid frame dictates that the HVAC air filter has this same size as shipped to a retailer, as presented to potential purchasers, and as stored by an end user. Because these typical HVAC air filters are thus rather bulky, they undesirably occupy a relative large volume of space on transportation vehicles and retailer shelves. Further, consumers may view the purchase, handling and storage of the bulky HVAC air filters as less than optimal.

These challenges have been magnified in recent years with the explosion of online shopping and direct to consumer fulfillment services. Now, instead of shipping a multi-count shipper to a retail location, an individual filter gets shipped to a customer's home. This introduces potential for significant damage to the product if unprotected, so the product is often placed in a box, inside another box or much heavier corrugate on the shipper. The multitude of boxes and containers introduces considerable waste and shipping costs, with product occupying more volume in transit than necessary.

SUMMARY

In light of the above, a need exists for a disposable air filter that overcomes one or more of the above-mentioned problems associated with conventional, disposable HVAC air filters.

The air filters may comprise an expandable pleated air filter media assembly packaged in a collapsed state within a container. The container may be separable to create first and second side frame members. These first and second side frame members may be recycled or otherwise disposed by the user, or may be used to retain the shape of the filter media assembly in an expanded state. The side frame members can be attached to corrugated edges of the pleated filter media assembly and joined to end frame members to form a perimeter frame. These and other aspects of the invention will be apparent from the detailed description below.

As used herein, the terms, "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments described herein.

DETAILED DESCRIPTION

Figure 1:
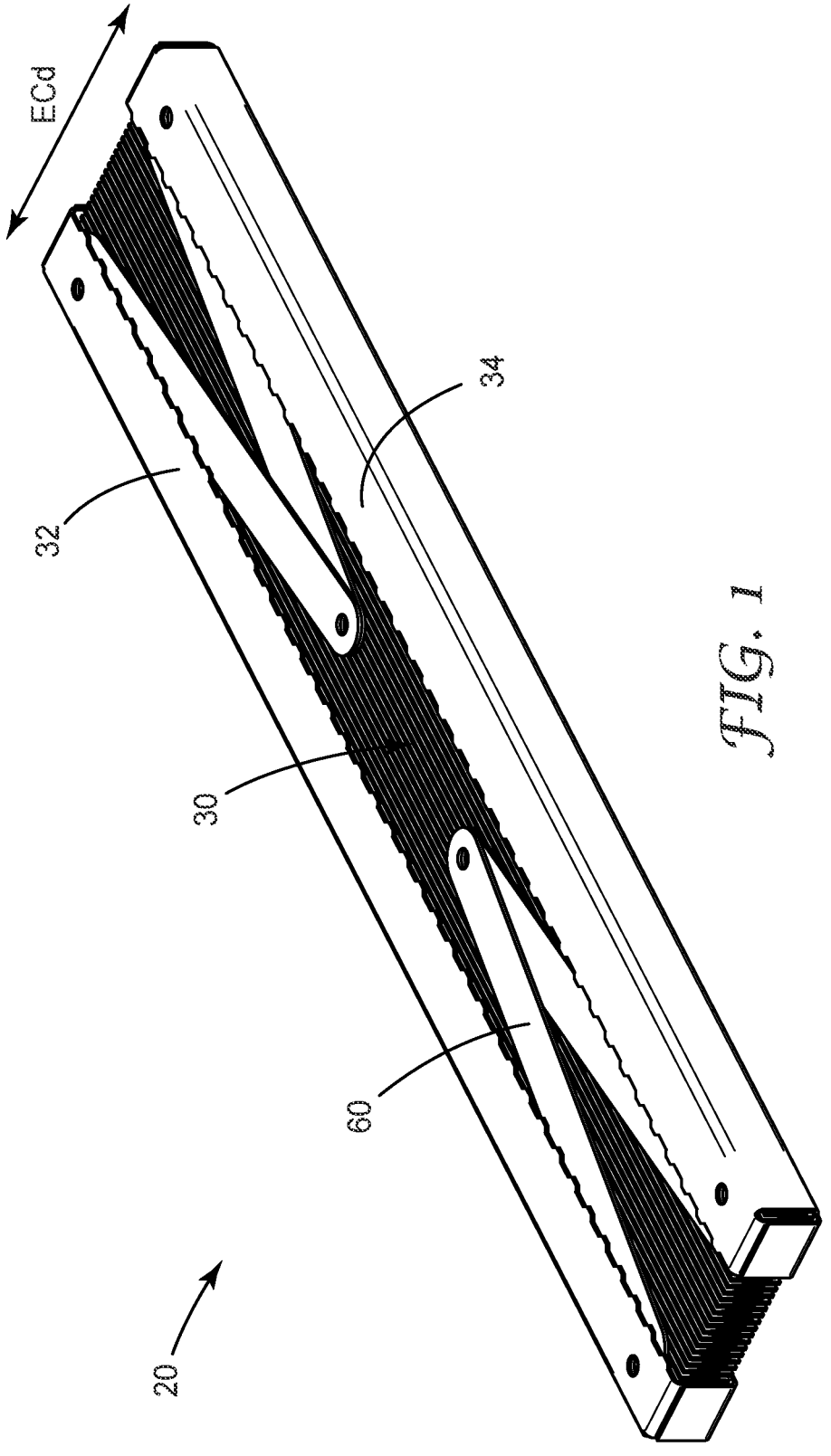
FIG. 1 is a perspective view of an air filter in accordance with principles of the present disclosure and arranged in a collapsed state.
Figure 2:
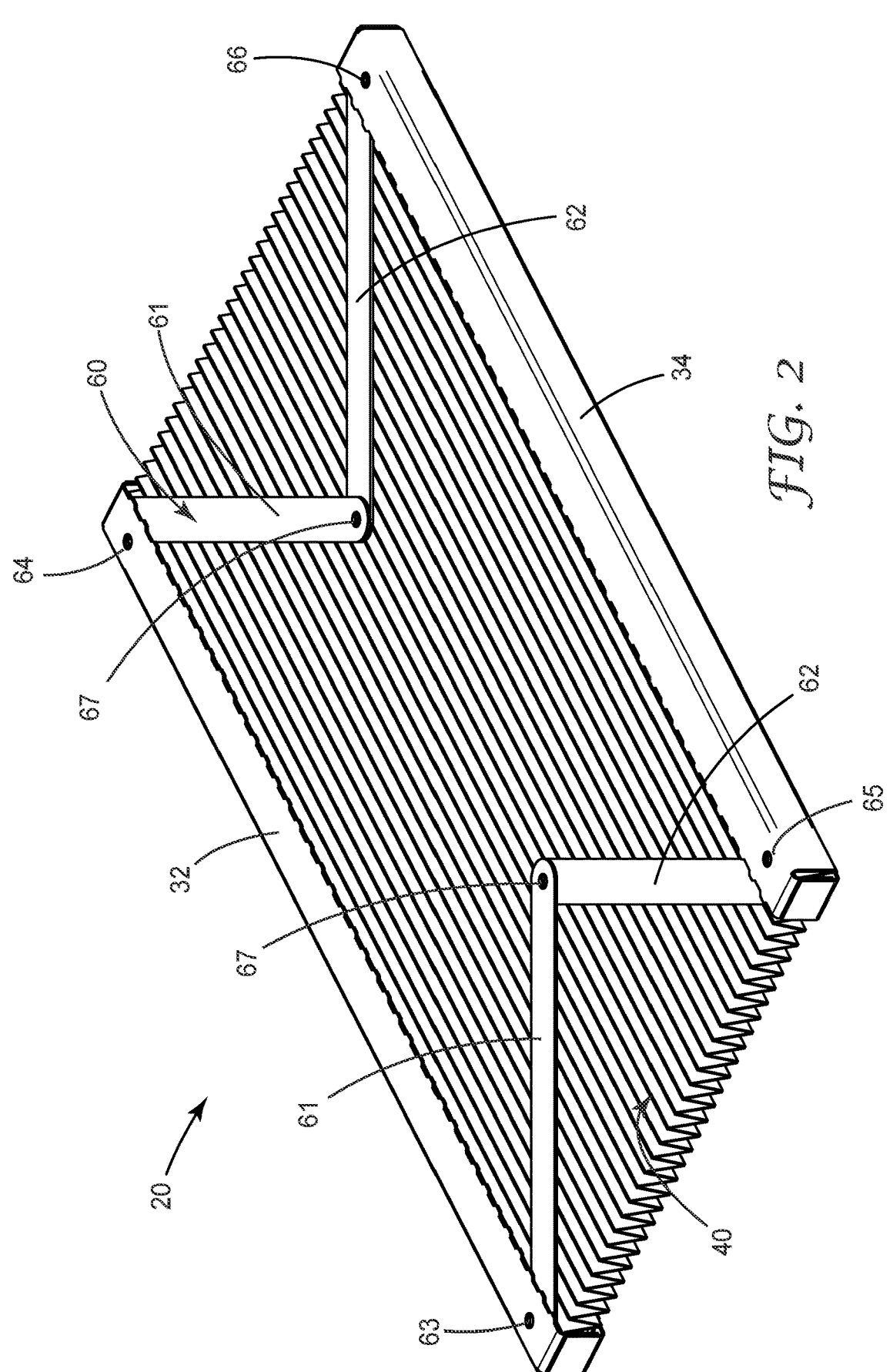
FIG. 2 is a perspective view of the air filter of FIG. 1 in a partially expanded state.
Figure 3:
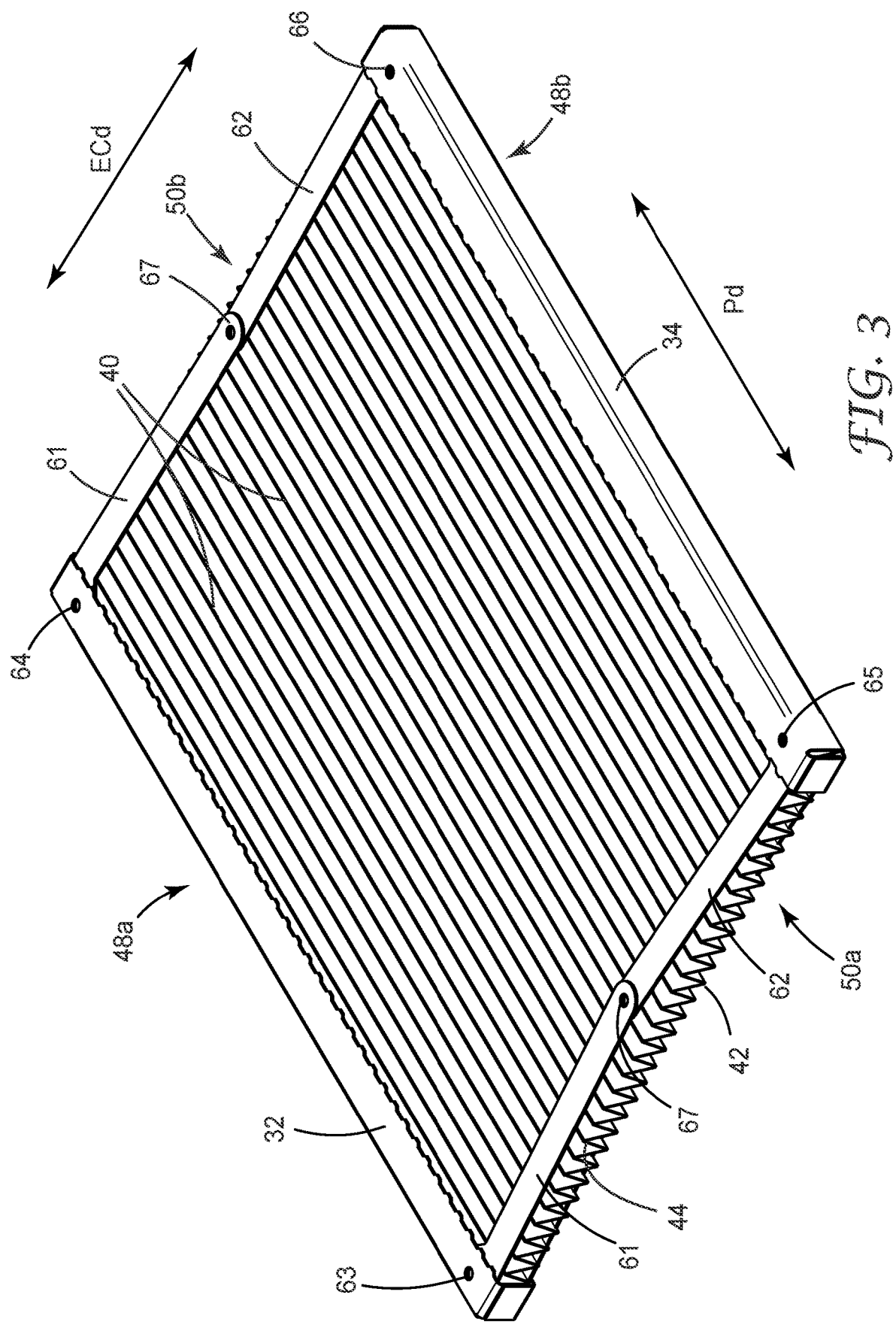
FIG. 3 is a perspective view of the air filter of FIG. 1 in an expanded state.

One embodiment of an air filter 20 in accordance with principles of the present disclosure is shown in FIGS. 1-3. The air filter 20 is generally configured to be expandable by a user from a collapsed, initial state (FIG. 1) to an expanded, end-use state (FIG. 3), and to be recollapsible if desired, along an expanding/collapsing direction $EC_d$ as indicated in FIG. 1. The air filter 20 includes a pleated filter media assembly 30, opposing end members 32, 34, and one or more shape retention structures 60. Details on the various components are provided below. In general terms, the pleated filter media assembly 30 is configured to readily transition between the collapsed and expanded states by directing the end frame member 32, 34 toward or away from each other. The shape retention structure(s) 60 can be also configured to readily transition between collapsed and expanded states, and further functions to maintain the air filter 20 in at least the expanded state. Upon transitioning (expanding) the pleated filter media assembly 30 to an expanded state that has a desired span (e.g., 25 inches), the shape retention structures 60 are manipulated as to secure the pleated filter media assembly 30 in the selected expanded state. A transition state, between the collapsed state and the expanded state, is depicted in FIG. 2. In some embodiments, a removable wrapper or other packaging can be provided to initially retain the air filter 20 in the collapsed state to save space with shipping and display and can be removed to allow expansion. In some embodiments as described below with respect to FIGS. 9-12, the removable packaging can include side frame elements, described below, that can be later attached or applied to the filter media assembly as shape retention structures to maintain the air filter in the expanded state.

The pleated filter media assembly 30 can assume a wide variety of forms useful for HVAC air filtration presently known, or in the future developed. As used herein, the term "pleated" refers to a web of filter media at least a portion of which has been folded rows of generally parallel, oppositely oriented folds that provide alternating pleats and valleys on both sides of the filter media assembly. For example, and as best shown in FIG. 3, the pleated filter media assembly 30 includes a plurality of pleats 40 each including a fold line 42 defining a pleat tip 44 and a pair of adjacent panels. Such a structure will exhibit a pleat direction (Pd, indicated in FIG. 3), that is parallel to the elongate pleat tips and is generally orthogonal to the expanding/collapsing direction ECd. Materials and construction of the pleated filter media assembly 30 are typically such that the pleated filter media assembly 30 can be repeatedly transitioned (e.g., several times) between an expanded condition as in FIG. 3 and a collapsed condition as in FIG. 1 (although the shape retention structure 60 can impede or prevent collapsing of the pleated filter assembly 30 from expanded condition as described below).

Various parameters of the pleated media (e.g. pleat spacing, pleat height, and so on) can be chosen as desired; typically such parameters will be chosen for the pleated filter media in its expanded, in-use configuration. The pleated structure allows the filter media to be "accordionized" into a collapsed configuration in which the pleat tips (and pleat panels) are crowded quite close together or even in contact with each other, and then expanded into the in-use configuration at the desired time. A spacing distance between successive pleat tips 44 in the expanded condition is greater than that of the collapsed condition. Exemplary air filter 20 as depicted in FIGS. 1-3 is of a fairly common filter design used in many residential HVAC systems. Often, such filters have a depth (which will correspond approximately to the previously-described pleat "height" plus a small amount added by the thickness of the frame) of nominally one inch. However, in some embodiments, so-called "deep-pleat" air filters may be used, with a nominal depth (and corresponding pleat height) of up to e.g. four inches.

At least when expanded into an expanded configuration, the pleated filter media assembly 30 can have a rectangular shape (which includes square shapes) as shown e.g. in FIG. 3 defining opposing ends 48a, 48b and opposing edges 50a, 50b. For clarity of description, items 48 will be referred to herein as the "ends" of the pleated filter media assembly 30; items 50 will be referred to as the "corrugated edges" of the pleated filter media assembly 30.

The pleated filter media assembly 30 can be expanded at least once from a collapsed condition (as in FIG. 1) to an expanded condition (as in FIGS. 2 and 3). In some embodiments, the assembly can be repeatedly transitioned back and forth between an expanded condition as in FIG. 3 and a collapsed condition as in FIG. 1. However, in some embodiments the assembly may only need to be expandable from a collapsed condition to a desired expanded condition (e.g., an expanded condition in which the assembly has a span that matches the dimension of a filter receptacle of an HVAC system). In some such embodiments, the assembly may not necessarily need to be collapsible fully back to the original collapsed condition. Rather, in some such embodiments the assembly need only be collapsible to an extent to correct an inadvertent over-expansion past the desired expanded condition as discussed later.

It is noted that the "expanded" condition of the pleated filter media assembly 30 as an individual component generally corresponds with the "expanded" state of the air filter 20 (FIG. 3) as a whole (and the "collapsed" condition of the pleated filter media assembly 30 similarly corresponds with the "collapsed" state of the air filter 20 (FIG. 1)), except that the air filter 20 includes additional components (as described herein) that can retain the pleated filter media assembly 30 in the particular size and shape of the expanded condition. In other words, while the pleated filter media assembly 30 may be transitioned to any of a number of different "expanded conditions" and "collapsed conditions", the pleated filter media assembly 30 cannot typically, in and of itself, self-retain the shape of any one particular condition. The air filter 20, however, as a whole (with first and second side frame pieces installed along the corrugated edges as described herein) can self-retain the shape of a selected expanded state.

Pleated air filter media assembly 30 may comprise any suitable air filter media. The air filter media is typically sheet-like, with (with the air filter in an expanded condition)

a span along the expanding/collapsing direction, and a width along the pleat direction, that are considerably greater than the thickness of the air filter media. Any suitable pleated air filter media may be used. In some embodiments, filter media may be, or include, a nonwoven material. For example, the filter media 60 can be constructed, for example, from nonwoven fibrous media formed of thermoplastics or thermosetting materials such as polyolefins including polypropylene, HDPE, LDPE, LLDPE and metallocene polyolefins; polyesters including aromatic and aliphatic polyesters, polyamides such as nylon 6, nylon 6,6, nylon 12, etc.; natural fibers including cellulose fibers such as rayon, cotton, and the like, acrylic fibers, olefin copolymers such as EMA, EVA and the like, Teflon, polyurethanes, polyvinyl chloride and combinations thereof. Other suitable, non-limiting materials for the filter media include porous foams, nonwovens, papers, fiberglass, or the like.

In some embodiments, filter media may comprise fiberglass fibers. Nonwoven webs which may be used as, or as a layer, of, the filter media can be a high loft spunbond web, such as described, for example, in U.S. Pat. No. 8,162,153 to Fox et al. In some embodiments, the filter media can be, or include, a low loft spunbond web, such as those described in U.S. Pat. No. 7,947,142 to Fox et al. In some embodiments, an electrostatic charge is optionally imparted into or on to material(s) of the filter media. Thus, the filter media can be an electret nonwoven web. Electric charge can be imparted to the filter media in a variety of ways as is well known in the art, for example by hydrocharging, corona charging, etc. (e.g. as described in U.S. Pat. No. 7,947,142 to Shah et al.). In other embodiments, the filter media is not electrostatically charged. Pleats can be formed in the filter media using various methods and components as are well known in the art, for example those described in U.S. Pat. No. 6,740,137 (Kubokawa et al.) and U.S. Pat. No. 7,622,063 (Sundet et al.). Other non-limiting example of useful nonwoven web formats include bi-modal fiber diameter meltblown media such as that described in U.S. Pat. No. 7,858,163 (Angadjivand et al.)

In some embodiments, the filter media may include one or more reinforcing layer or entities comprising e.g., an open cell structure, a porous media, a nonwoven scrim, a netting, a wire mesh, or any such structure(s), which may be provided along with (e.g., bonded to) a layer that performs the actual filtration, and which may be made of any suitable material. Such an entity may be e.g., bonded only to the pleat tips of the pleated media or, it may be bonded to a major surface of the media and then pleated along with the media to be in contact with the panels of the pleats as well as with the pleat tips. In some embodiments, the pleated filter media assembly 30 may comprise reinforcing entities in the form of a set of extruded reinforcing filaments of the general type described in U.S. Patent Application Publications 2021/0229022 (Zhang et al.) and 2021/0229023 (Lise et al.), both of which are incorporated by reference in their entirety herein. Whether inherently, or as assisted by reinforcing entities (e.g. set of extruded filaments, or a wire mesh) that are bonded at least to the pleat tips, the filter media will be sufficiently strong to survive the air pressure applied in conventional forced-air heating and/or cooling systems.

Returning to FIGS. 1-3, the end frame members 32, 34 are generally configured for mounting to one the ends 48a, 48b, respectively, of the pleated filter media assembly 30, and in some embodiments can be identical or substantially identical. The end frame members 32, 34 serve as handles, promoting user grasping and manipulation of the air filter 20, covering of the ends 48a, 48b of the pleated filter media assembly 30. During use of the air filter 20 for filtration, the end frame members 32, 34 will serve to support the expanded state of the air filter 20. The end frame members 32, 34 will also, in presently preferred embodiments, occlusively cover the ends 48a, 48b of the pleated filter media assembly 30 so as to prevent or minimize any leakage of air around the ends 48a, 48b of the pleated air filter media assembly during use.

In some embodiments, the end members 32, 34 are constructed of a material commonly used for HVAC filter frames, such as paper, paperboard, corrugated cardboard, plastic, metal, etc. The end members 32, 34 can each have a length that substantially corresponds with a width dimension (along the pleat direction Pd) of the corresponding pleated filter assembly end 48a, 48b, although other dimensional relationships are envisioned. The length of the end members 32, 34 can extend beyond the width dimension of the filter assembly end 48a, 48b, particularly when including tabs or other structures to couple with side frame members, as described below with respect to FIGS. 9-13.

While each of the end members 32, 34 may encompass a small portion of each of the opposing sides 50a, 50b of the pleated filter media assembly 30, presence of the end members 32, 34 does not overtly restrict collapsing of the pleated filter media assembly 30. For example, at least a majority, and in some embodiments at least 70%, 80%, 90% or at least 95%, of a length of the opposing sides 50a, 50b are unencumbered by the end members 32, 34, allowing the pleated filter media assembly 30 to be condensed into a compact format in the collapsed state (e.g., at least a majority of the pleats 40 (FIGS. 2 & 3) of the pleated filter media assembly 30 are free of the end members 32a, 32b).

Figure 4:
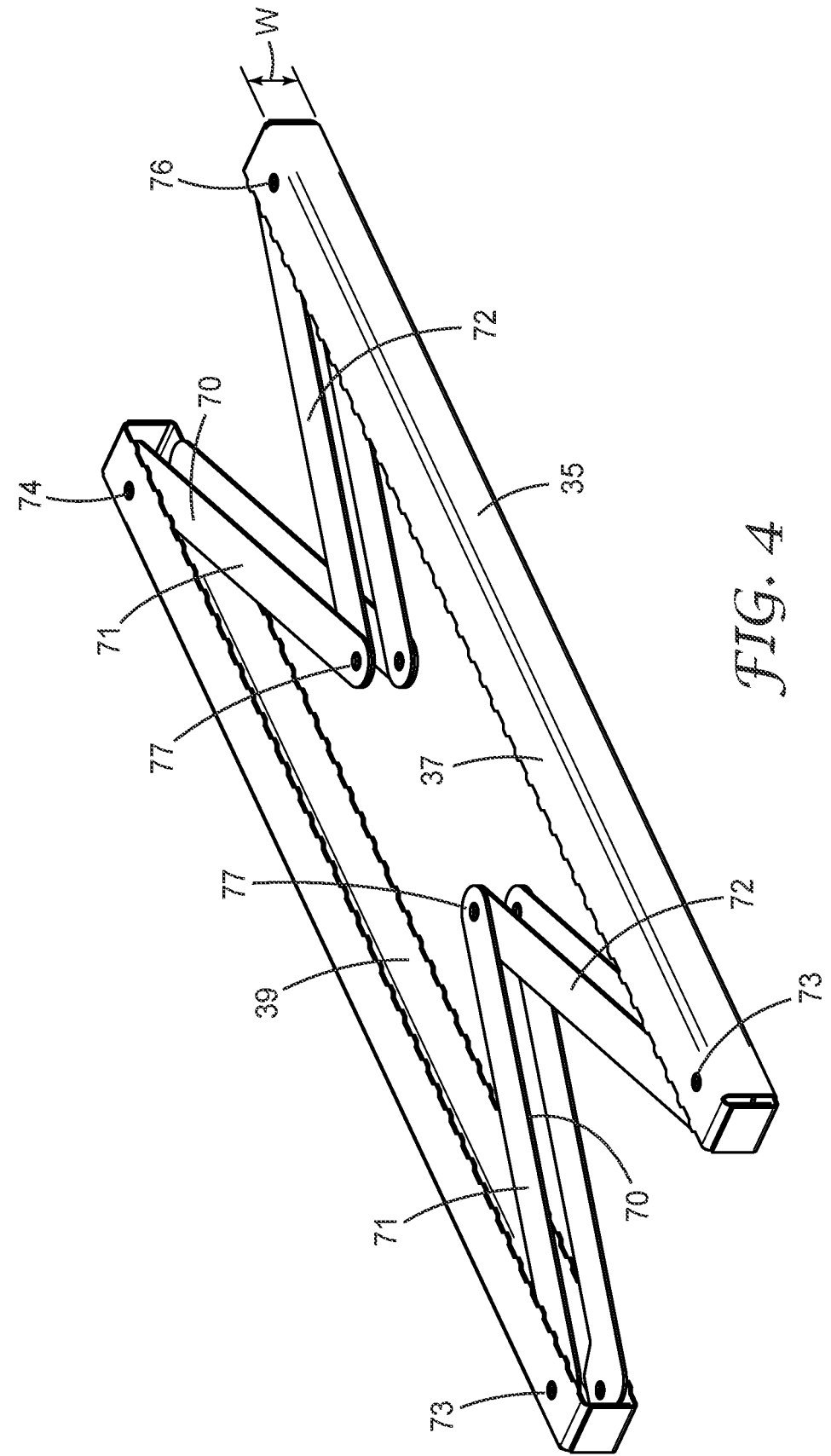
FIG. 4 is a perspective view of a frame for an air filter assembly according to embodiments of the present disclosure.

In many embodiments, end frame pieces 32, 34, may be generally U-shaped (as seen in FIG. 4). The resulting framed air filter will thus be the type of air filter generally referred to as a channel-framed filter. In such embodiments, an end frame member 32, 34 may exhibit an outer end wall 35, and upstream and downstream flanges 37 and 39 that each extend inwardly (toward the geometric center of the framed air filter) therefrom. The width W of the outer end wall 35 will typically correspond to the upstream-downstream dimension of the resulting framed air filter (e.g., an outer sidewall that is approximately one inch in width will correspond to a nominally one-inch framed filter, e.g., in the case of a 25"×16"×1" framed filter). Thus, the "width" of an outer end wall 35 specifically means the dimension of the outer sidewall along the upstream-downstream direction of the air filter, and does not correspond to the previously-defined "width" of the pleated air filter media assembly and air filter.

The air filter 30 includes a pair of shape retention structures 60 on a downstream face of the filter media assembly 30. Each shape retention structure 60 includes first and second arms 61, 62. The first arms 61 are pivotably coupled to the first end piece 32 at pivot points 63, 64 and the second arms 62 are pivotably coupled to the second end piece 34 at a pivot points 65, 66. Further, the arms 61, 62 are pivotably coupled to one another at a pivot point 67. The pivotable connections 63, 64, 65, 66, 67 can be accomplished in a variety of manners as understood by one of ordinary skill (e.g., pinned coupling, living hinge, etc.). Regardless, the arms 61, 62 readily rotate or pivot relative to one another and relative to the corresponding end member 32, 34 in transitioning between the collapsed and expanded states. It is presently preferred that the locations for pivot points 63, 64 and/or 65, 66 are spaced apart along the longitudinal length of the respective frame end pieces 32, 34 such that the pivotal couplings are located generally adjacent to, but not at, the longitudinal ends of the end pieces 32, 34. Other arrangements, however, are possible.

In some embodiments, each primary shape retention structure 60 can include one or more additional components that robustly hold or lock the arms 61, 62 relative to one another in the expanded state (e.g., a clasp that can be slid over the pivot point 67, complimentary protrusion and groove arrangement on the arms 61, 62, etc.). Regardless, the primary shape retention structure 60 is effectively locked in the expanded state and extends in the expanded direction (ECd) such that the air filter 20 retains a size and shape of the pleated filter media assembly 30 in the expanded state, with this size and shape corresponding with the expected size and shape of the filter receiving housing or bay included with the user's HVAC system. Thus, the primary shape retention structure 60 functions to: (1) provide a strong support to the pleated filter media assembly 30 so that the pleats 40 (FIGS. 2& 3) will not deform under air pressure, and (2) locks the air filter 20 to a fixed sized when the primary shape retention structure 60 is fully deployed/expanded.

In some embodiments, an attachment mechanism such as, for example, adhesive, hook and/or loop materials and/or dual lock materials can be provided with at least the arms 61, 62 to hold the pleated filter media assembly 30 in one or both of the collapsed and expanded states. For example, loop material could be added to select regions of the pleated filter media assembly 30. Alternatively, some embodiments of the pleated filter media assembly 30 inherently form "loop" structures along the filter media. Hook material can be added to the filter side of the arms 61, 62. The hook material would engage with the pleat tips in the collapsed state, with the arms 61, 62 thus serving to retain the pleated filter media assembly 30 in the collapsed state. To deploy or articulate the arms 61, 62, the arms 61, 62 are lifted off of the pleated filter media assembly 30, rotated as desired, and then re-attached. Further, the so-constructed arms 61, 62 could be used at the ends of the pleated filter media assembly 30 and collapse toward the center to support the ends.

In addition, or in the alternative, the air filter 30 includes a pair of shape retention structures 70 on an upstream face of the filter media assembly 30. This arrangement is depicted in FIG. 4, with the filter media assembly omitted. Like shape retention structures 60, each shape retention structure 70 includes first and second arms 71, 72. The first arms 71 are pivotably coupled to the first end piece 32 at pivot points 73, 74 and the second arms 72 are pivotably coupled to the second end piece 34 at a pivot points 75, 76. Further, the arms 71, 72 are pivotably coupled to one another at a pivot point 77. The pivot points 74, 74, 75, 76, 77 are generally colinear in a direction orthogonal to the pleat direction Pd and expandable direction (ECd) when the filter is in the expanded state. The air filters of the present disclosure can include one, two, three, four, or any other number of pivotable shape retention structures.

The air filter 20 can initially be in the collapsed state (and thus has a compact volume) during shipping, storage, and/or on the retailer's shelves. The air filter 20 can optionally include additional packaging (as described below) that holds the air filter 20 in the collapsed state. When the user is ready to install the air filter 20 to an HVAC system, the user removes collapsed filter from the packaging and simply pulls on the two end members 32, 34 to stretch the pleated filter media assembly 30 and articulate the shape retention structures 60 (and/or 70) to the expanded state of FIG. 3. The fixed size dictated by the shape retention structures in the expanded state corresponds with an expected size of the filter receiving housing or bay of the HVAC system. The air filter 20 is then installed to the HVAC system and functions to remove contaminants from the HVAC system airflow, and can later be discarded as described above.

The air filters of the present disclosure provide a marked improvement over previous designs. The air filters can be collapsed to save shelf-space and transportation space. The collapsed filter can be easily expanded to it usable form, making it easy for end-users to use the air filter. Further, the expanded filter is self-supported, requiring no further frame material.

Figure 5:
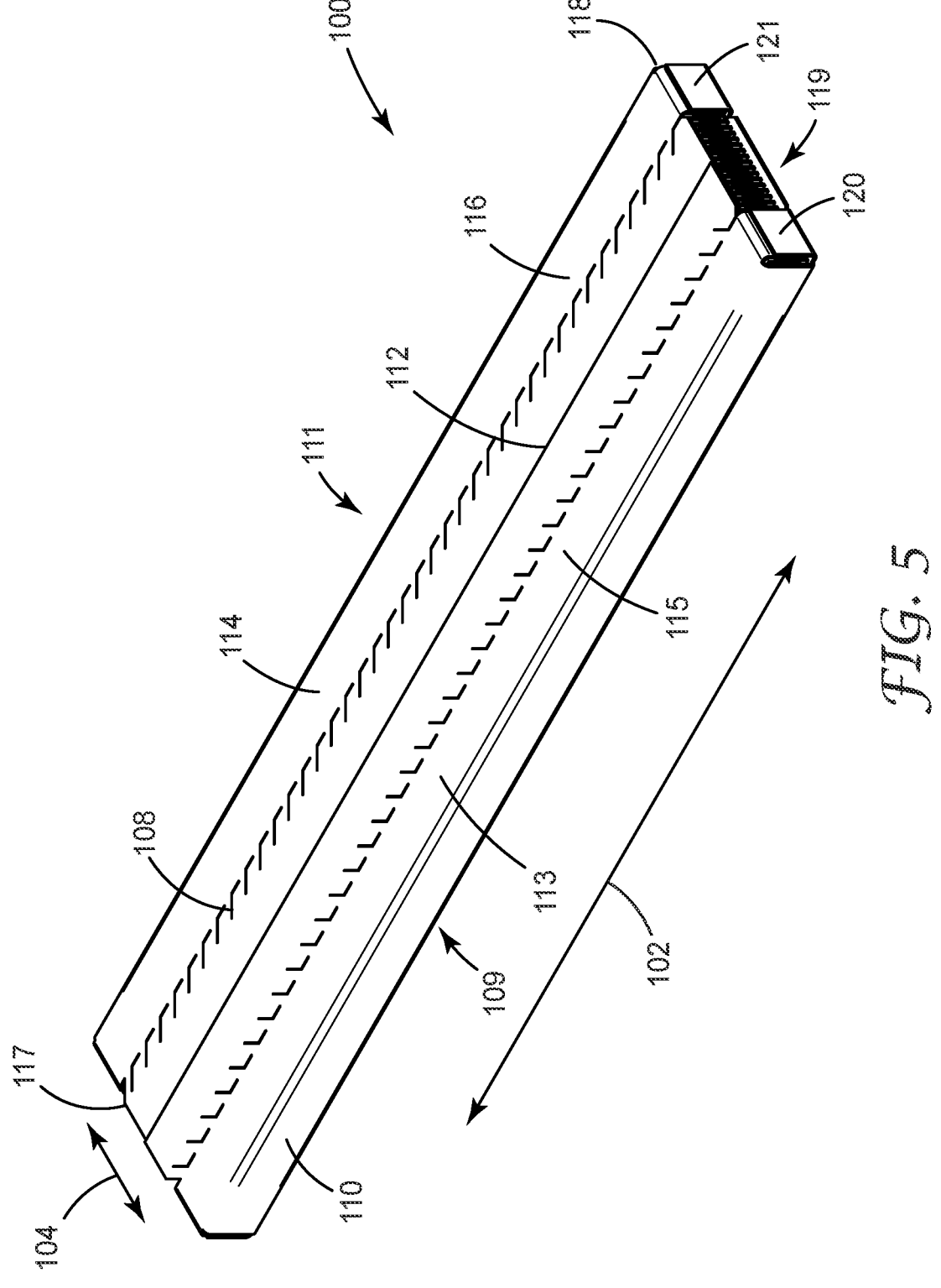
FIG. 5 is a perspective view of a container for shipping and displaying the air filters of the present disclosure.
Figure 6:
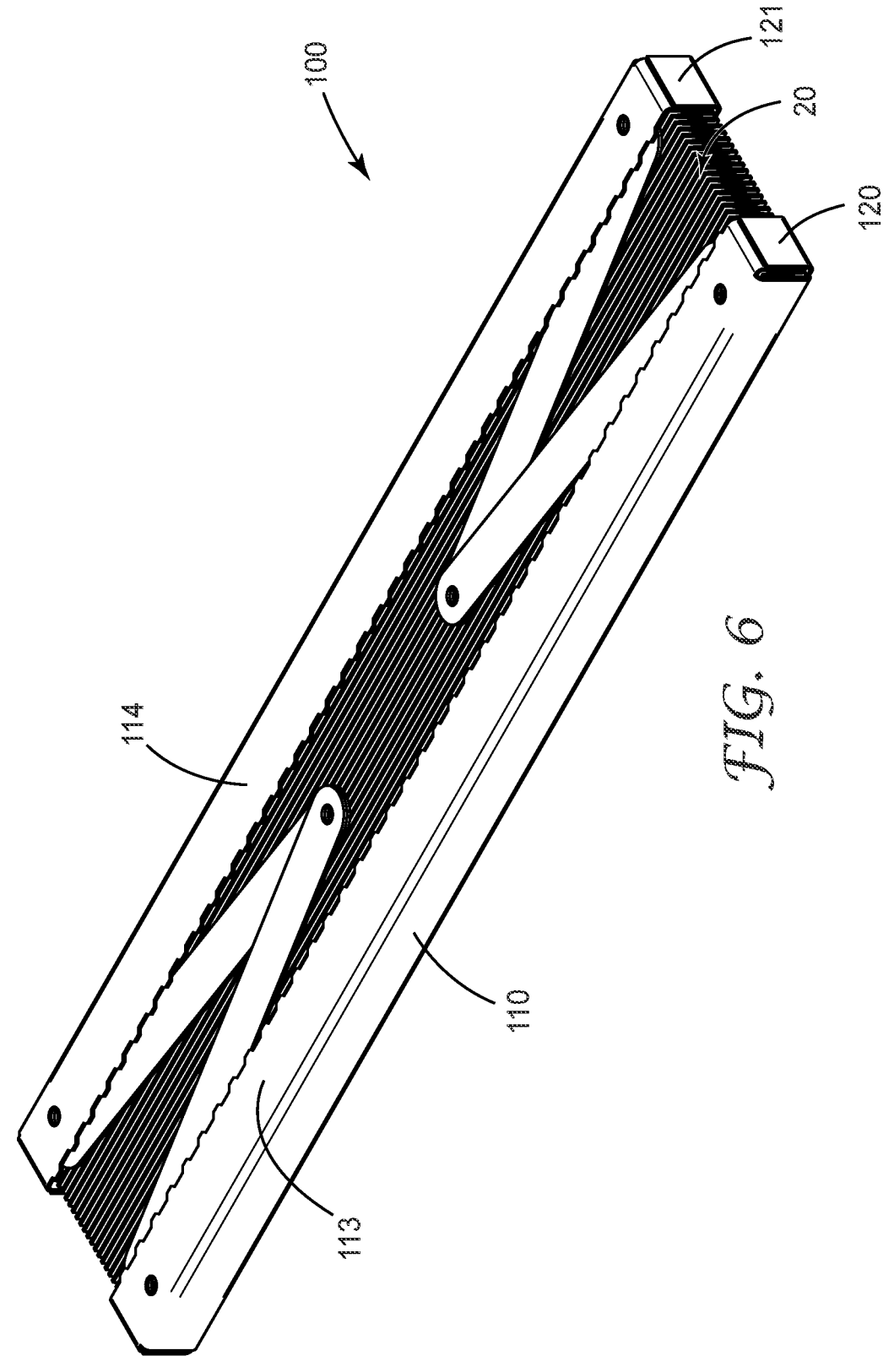
FIG. 6 is a perspective view of the container of FIG. 5, opened to reveal an air filter of FIG. 1 in the collapsed state.
Figure 7:
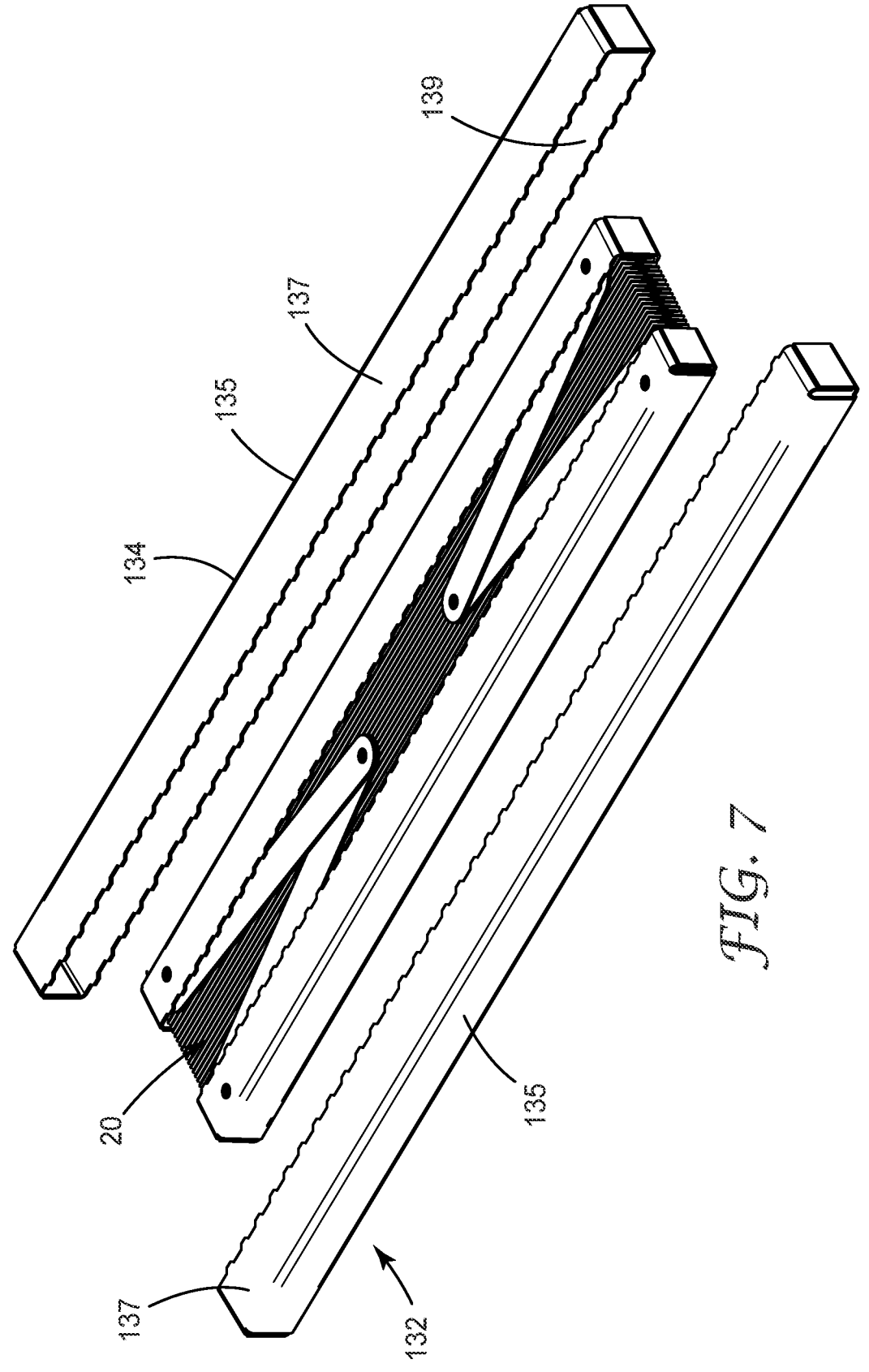
FIG. 7 is an exploded, perspective view of the container and air filter of FIGS. 5-6.

A packaging container 100 for shipping and displaying the filter 20 in the collapsed state is depicted in FIGS. 5-7. The packaging container 100 includes a length 102 generally corresponding to a length of the end frame members 32, 34 of an air filter 20, a width 104 generally corresponding to the length of a filter 20 in the collapsed state, and a height 106 generally corresponding to the "width" W of the frame end pieces 32, 34. The container 100 includes opposing top 108 and bottom faces 109 and opposing side faces 110, 111 disposed in generally orthogonal orientation to the top and bottom faces. 108, 109. Each face 108, 109, 110, 111 extends continuously along the length 102 of the container 100, though in alternative embodiments any one of the faces may be discontinuous. In various embodiments, the container may be constructed of materials commonly used for HVAC filter frames, such as paper, paperboard, corrugated cardboard, plastic, metal, etc. The material may be the same, or different, as the material used to construct the air filter 20.

The top face 108 of the container includes a central section 112 that is separable from outer sections 113, 114 along parallel, friable connections 115, 116 that allow an unneeded portion of the top face 108 to be detached from the container and provide at least partial access to the air filter 20 within. By a friable connection is meant a connection in the form of a line of weakness that is specifically configured to easily allow complete separation (manually, e.g. by ripping with fingers) along the line of weakness. Often, such a line of weakness may be provided by a line of perforations or partial perforations. If perforations are used, the perforations may be shaped in accordance with any of the accepted perforation patterns including linear, angled, Y-shaped, V-shaped, dual-angled offset, sinusoidal, etc. The lines of weakness may for example comprise a hole or slit, or several holes or slits extending through the thickness of the container material. The lines of weakness may be continuous and provided by a single continuous feature, or discontinuous and provided by a multiplicity of features acting in combination. Though not depicted in FIGS. 5 & 6, the bottom face 109 also includes a central section that is separable from outer sections along parallel, friable connections. The friable connections on the top and bottom faces 108, 109 are generally coplanar in a plane parallel to one or both side faces 110, 111. Removing the top central section 112 and bottom central section exposes a portion of the air filter 20 within the package (FIG. 6).

The container 100 further includes opposing ends 117, 118, with one or both ends including an opening 119 disposed between multilayer tabs 120, 121. Though exposing a portion of the air filter 20, the opening 119 provides a user with easier access initiate separation of the central section 112 from the top face 108 along the parallel, friable connections 115, 116, but is not strictly necessary. As an alternative, one or more of the ends may include a continuous face or flap covering a portion of the air filter 20. The friable connection lines may extend over a central portion of the end face from the top or bottom face, allowing the user to separate an end face and top face 108 as an integral piece.

The central sections can have any desired width, primarily depending on the desired dimensions of any one of a) the collapsible air filter 20; and b) the upstream and downstream flanges of side frame members 132, 134. Furthermore, the central sections need not be located at the latitudinal center of the container, and may be shifted near one of the side edges as circumstances dictate.

As further detailed below, the tabs 120, 121 may be created by an overlapping plurality of flaps on the end of the each of the outer sections 112, 113. For example, at least a majority, and in some embodiments at least 60% or at least 70% of a length of the opposing sides ends 117, 118 are contained within opening 119. The reinforced, multilayer construction of the end tabs 120, 121 are designed to provide strong corner support to container 100. The added corner support provides crush resistance during shipping and storage of the filter 20 prior to placement in an HVAC system.

The air filter 20 is initially arranged in the collapsed state (FIG. 1) in which the pleated filter media assembly 30 is condensed (and held) in container 100. The container 100 can be shipped to a retailer, stored at the retailer's place of business, displayed on the retailer's shelves, transported by a purchaser/user, and/or temporarily stored by the user in the collapsed state. At each of the stages, container 100 and accordingly the air filter 20 beneficially occupy a significantly reduced volume (as compared to the expanded state), thereby reducing associated costs and increasing user satisfaction.

When the user is ready to install the air filter 20 to an HVAC system, the user simply removes the air filter 20 from the container 100 by separating at least central section 111 from the top face 108. The user then removes the air filter 20 and pulls on the two end members 32, 34 to stretch the pleated filter media assembly 30 to a desired size corresponding with the filter receiving housing or bay of the HVAC system. As a point of reference, where the HVAC system's filter receiving bay is sized and shaped for use with a 20″ (width)×25″ (length)×1″ (depth) air filter, the air filter 20 can have a width on the order of 20″ and a depth on the order of 1″ in both the collapsed and expanded states, and can be arranged in the expanded state to have a length on the order of 25″. However, in the collapsed state, the air filter 20 will have a length much less than 25″ (e.g., less than 50% of the length in the expanded state). The shape retention structures 60, 70 are configured to allow desired stretching of the pleated filter media assembly 30. Once the air filter 20 has been stretched to the desired size (e.g., desired length), the shape retention structures 60, 70 secure and hold the pleated filter media assembly 30 to the selected size.

Upon removing both the top and bottom central sections (FIG. 7), the user is left with opposing, generally U-shaped frame members 132, 134 that include an outer end wall 135, and upstream and downstream flanges 137 and 139 that each extend inwardly and opposed to one another. These frame member 132, 134 can be recycled by the user or otherwise disposed of. In the alternative, the newly created frame members 132, 134 can be positioned adjacent the corrugated edges of the air filter 20 to act as shape retention structures, as further explored in reference to FIGS. 9-13.

Figure 8:
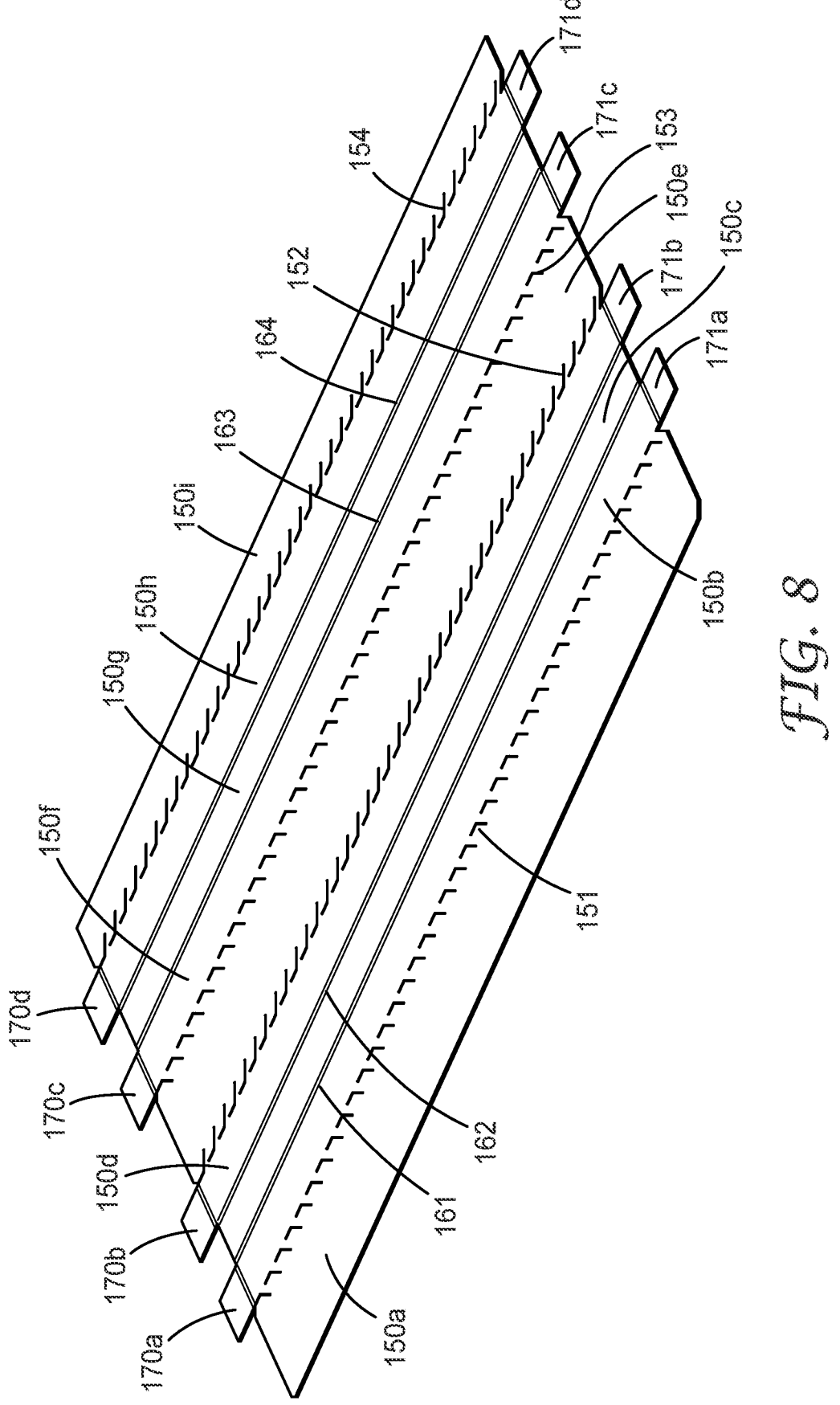
FIG. 8 is a perspective view of a blank for creating the container of FIGS. 5-7.

A blank 150 for creating container 100 is depicted in perspective view in FIG. 8. The blank 150 is generally rectangular in shape and includes four parallel, friable score lines, with the outer score lines 151, 154 creating the parallel friable connections 115, 116 on top face 108. The inner score lines 152, 153 provides parallel, friable connections on the bottom surface 109. The blank 150 further includes four parallel foldable score lines 161, 162, 163, 164 used to articulate the panels of the blank to form the three-dimensional shape of the container 100.

The central section of the bottom face 109 is provided by panel 150e between the inner score lines 152, 153. Similarly, the central section 112 of the top face 108 is provided by overlapping panels 150a and 150i, which tends to provide additional strength to the container 100. The outer, generally U-shaped frame member 132 is created by folding panels 150b and 150d about fold score lines 161 and 162, with panel 150c then becoming side face 110. Once folded, panel 150b represents the outer section 112 of the top face 108 (and upstream flange 137 of the outer frame member 132). The opposing outer, generally U-shaped frame member 134 is created by folding panels 150f and 150h about fold score lines 163 and 164, with panel 150g then becoming side face 111. Once folded, panel 150h represents the outer section 113 of the top face 108 (and upstream flange 137 of the outer frame member 134). The bottom face 109 will be formed by panels 150d, 150e, and 150f in combination, with panels 150d and 150f creating the downstream flanges 139 of the outer frame members 132 and 134, respectively.

Each of the blank panels 150b, 150d, 150f, 150h creating an upstream or downstream flange 137, 139 terminates in a flap disposed at each longitudinal end of the respective panel. Each flap extends outward from the edge of blank, creating alternating sections of panels having a greater length than the immediately adjacent components. The added length of each flap generally corresponds to the depth of the filter 20 to be packaged in container 100 (e.g., the "width" of outer end members 132, 134), but the flaps may individually be longer to wrap around the top or bottom faces 108, 109. In the depicted embodiment: blank panel 150b terminates in flaps 170a and 171a; blank panel 150d terminates in flaps 170b and 171b; blank panel 150f terminates in flaps 170c and 171c; and blank panel 150h terminates in flaps 170d and 171d. In other embodiments, one or more blank panel 150b, 150d, 150f, 150h may include a single flap, or no flap, as circumstances dictate.

As the blank is folded to create a three-dimensional container 100 structure, the flaps 170a-d and 171a-d may be folded in directions towards one another to create tabs 120, 121 providing crush resistance and corner support. The flaps 170a-d and 171a-d may be secured to one another using adhesive or sealant, as further described below. In some embodiments, the resultant tabs 120, 121 are generally flush with the sidewalls 110, 111. In other embodiments, such as those depicted in FIGS. 10-14, the tabs 120, 121 include an open slot between one of the flaps 170a-d and 171a-d and the sidewall.

Turning now to the embodiment of FIGS. 9-13, a container 100 can also be used to provide shape retention structures on an air filter 20, in that pieces of the container 100 remaining intact after unpackaging are used as shape retention structures to secure the air filter 20 in an expanded state. The shape retention structures provided by pieces of the container 100 can be in addition to or in lieu of the shape retention structures 60 and 70 described above. Except as noted below, the air filter 20 can be essentially identical to air filter 20 shown in FIGS. 1-3. In the embodiment depicted in FIGS. 9-12, the air filter 20 lacks pivotable shape retention structures, but includes tabs 80, 81, 82, 83 extending outwards from the longitudinal ends of the frame end members 32, 34; these tabs are used in coupling the frame end members 32, 34 to the U-Shaped frame members 132, 134 of the opened container 100.

Figure 9:
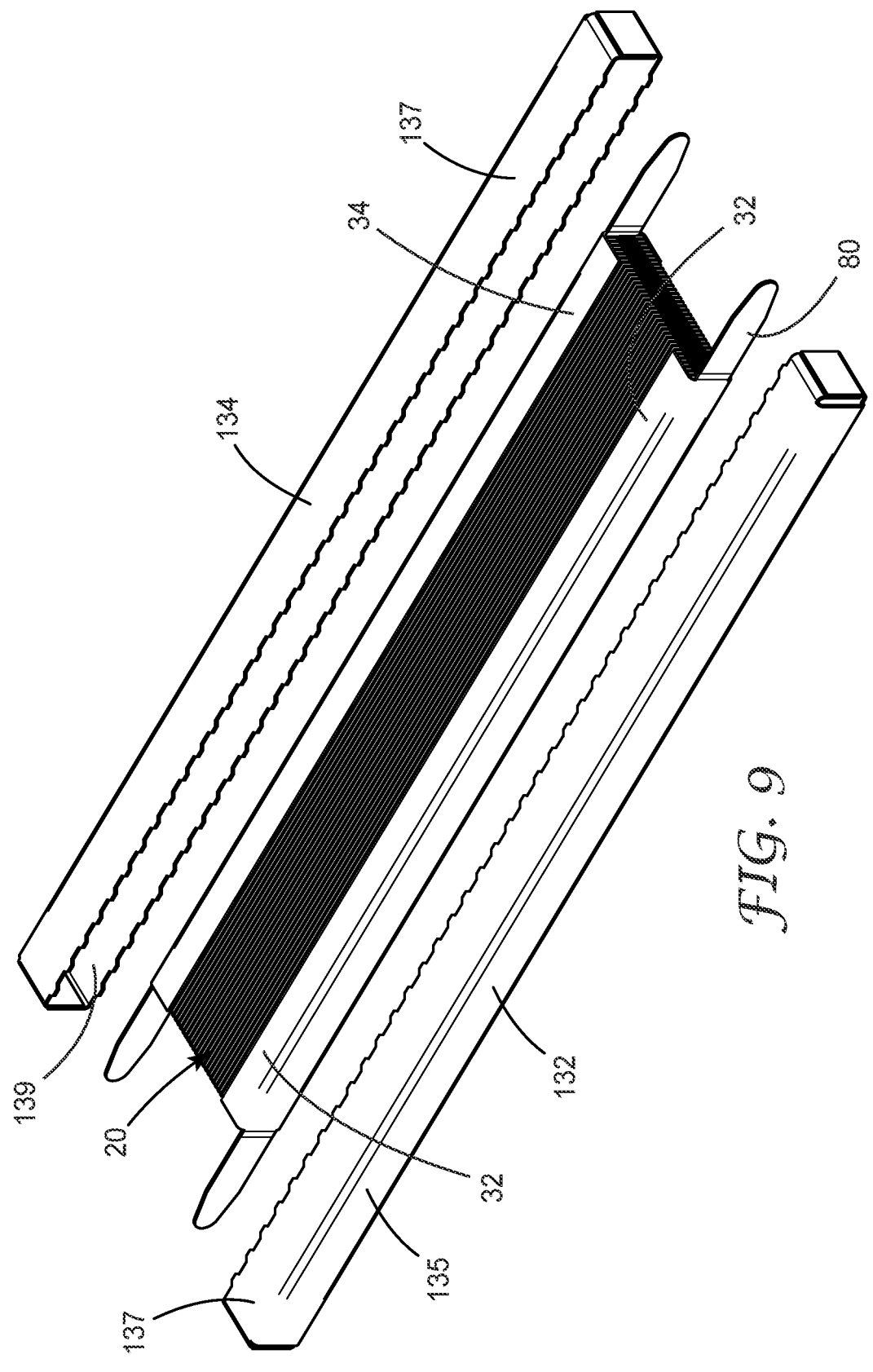
FIG. 9 is an exploded perspective view of an air filter assembly according to embodiments of the present disclosure in a collapsed state, with outside portions of a shipping container.
Figure 10:
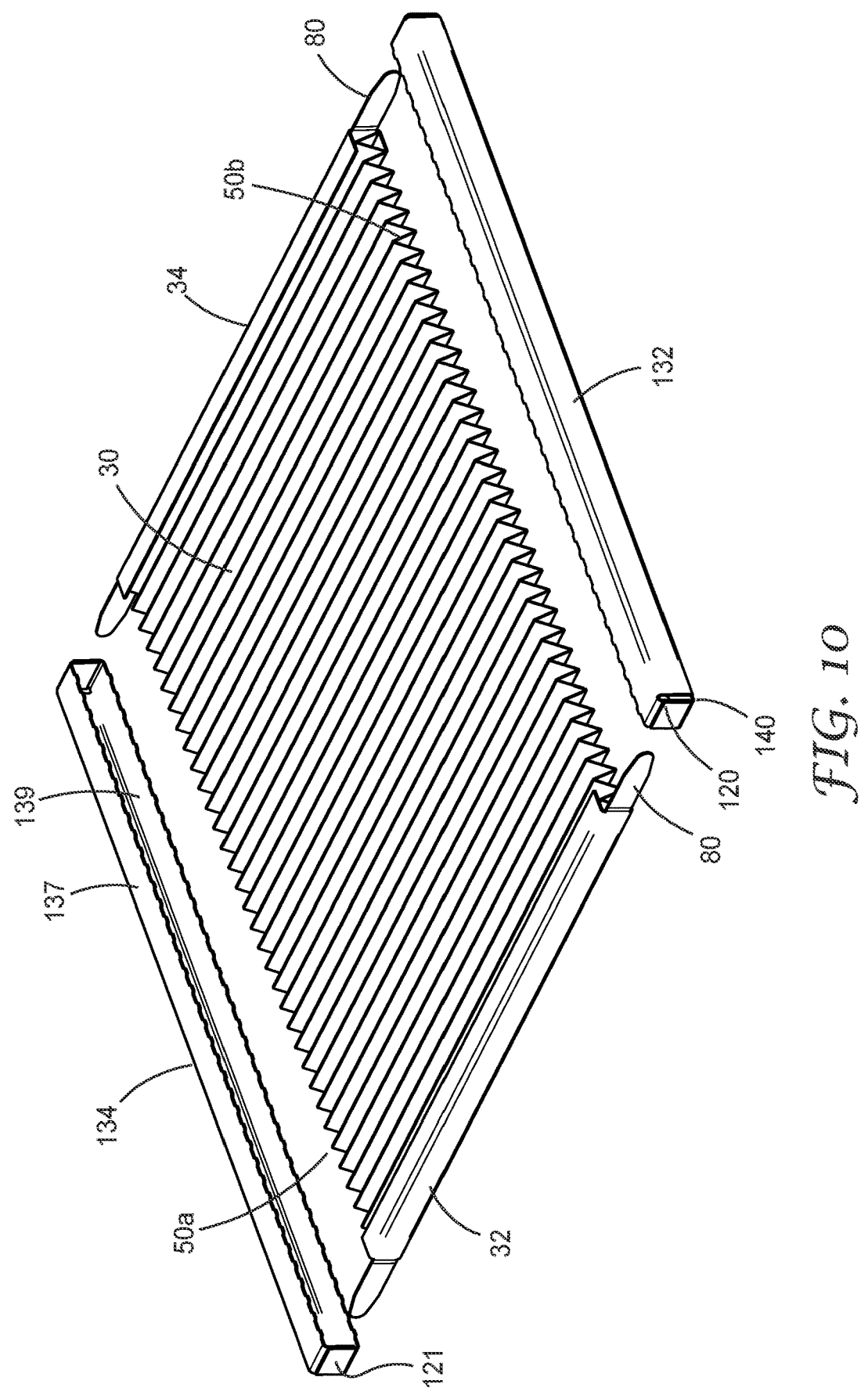
FIG. 10 is an exploded perspective view of an air filter assembly of FIG. 9, with side frame of the container pieces aligned with corrugated edges of the pleated media.

As depicted again in FIG. 9, the user is left with opposing, generally U-shaped frame members 132, 134 upon removing the air filter 20 from the container 100. These frame members 132, 134 may be secured adjacent the corrugated side edges 50a, 50b of air filter assembly 30 and are accordingly referred to as side frame members in reference to the embodiment in FIGS. 9-12. The side frame members 132, 134 each include an outer end wall 135, and upstream and downstream flanges 137 and 139 that each extend inwardly and opposed to one another. The side frame members 132, 134 will typically have a length that substantially corresponds to, and in fact establishes, the "span" (along the expanding/collapsing direction EC$_d$) of the pleated filter media assembly end 30, as evident from FIG. 11. In some embodiments, the length of side frame members 132, 134 may be fixed and non-alterable. Thus in some embodiments, the pleated air filter media assembly 30 will be expanded to one particular span that is defined by the pre-selected, fixed length of side frame members 132, 134. For example, the side frame pieces may have a fixed length of e.g. 16 inches, 20 inches, or 25 inches.

Figure 12:
FIG. 12 is a simplified perspective view of an air filter assembly of FIGS. 9-11 arranged in a frame in an expanded state.

With the expanded pleated filter media assembly 30 and other components in their end-use configuration, the above-mentioned opposing first and second end frame pieces 32 and 34 will be present on the ends 48a, 48b of the pleated filter media assembly 30, and the above-mentioned first and second side frame pieces 36 and 38 will be present on the corrugated edges 50a, 50b, of the pleated filter media assembly 30, so as to collectively provide a perimeter frame 90 as indicated in FIG. 12.

Figure 11A:
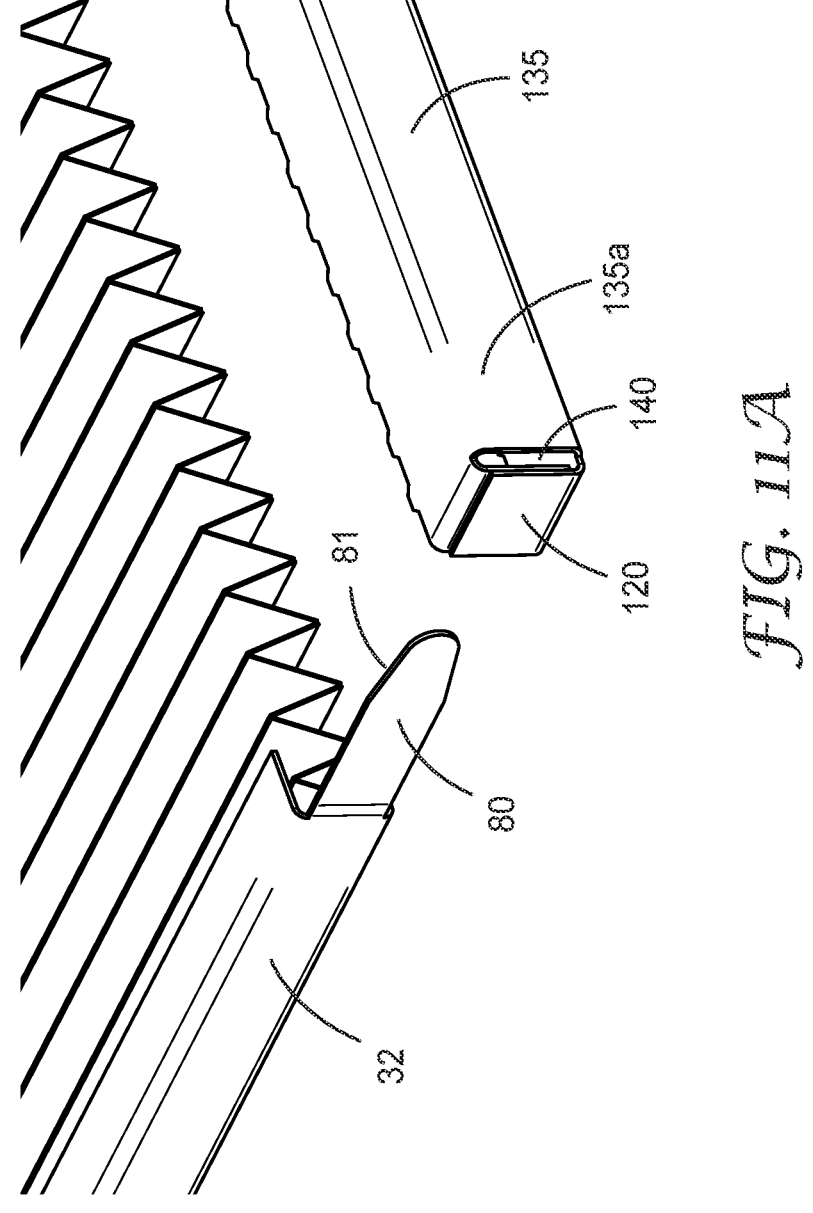
FIGS. 11A, 11B, and 11C are perspective views of the terminal ends of frame elements of the air filter assembly of FIGS. 9-10.
Figure 11C:
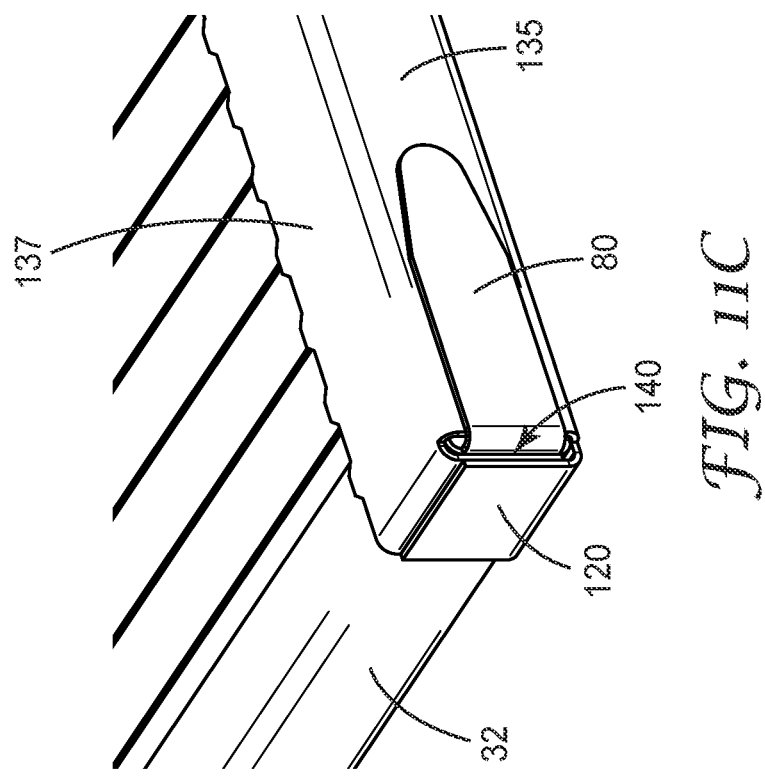
Figure 11B:
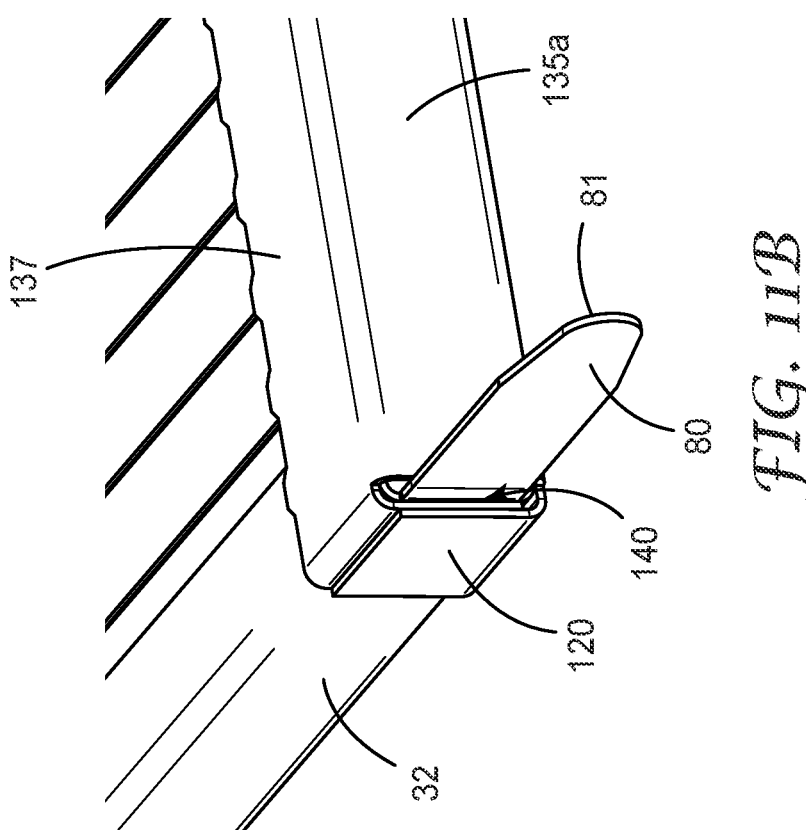

The side frame members 132, 134 may be secured in place in the finished frame 90 by any desired mechanism or combination thereof. In some embodiments this may be done at least in part by attaching terminal portions of the side frame members to terminal portions of end frame members where they come into close proximity, at the corners of the framed air filter. In some embodiments, side frame members and/or end frame members may have any suitable tab, slot, or combination thereof, that may enhance the attachment of the pieces to each other at the corners of the framed air filter. An approach in this vein is depicted in FIGS. 11A-B, where representative tab 80 on the end frame member 32 is received in open slot 140 on side frame member 132. The tab 80 can be folded/wrapped around a the outer wall 135 and then bonded to the surface (inward or outward) of the outer wall. The inward facing surface 81 of the tab 80 may include an adhesive (e.g., a pressure sensitive adhesive) or first component of a mechanical fastening system (e.g., the hook in a hook-and-loop system). The surface of the outer wall 135a nearest the slot 140 may further include an adhesive or second component of a mechanical fastening system (e.g., the loop in a hook-and-loop system. These connective elements may be provided with a release liner to avoid premature bonding during shipping or storage.

In some embodiments, the attachment of terminal portions of the side frame members to terminal portions of the end frame members may be permanent, e.g. if the side frame pieces are only to be used one time. However, in some embodiments, side frame members may be reusable, meaning that they can be removed from a spent air filter 20 and then installed onto a new pleated filter media assembly 30 to form a perimeter frame of a new air filter 20. (Thus in some embodiments, replacement filter media assemblies 30 may be supplied to end users, without including any side frame pieces 132, 134 therewith). In such a case, any method of attaching the terminal portions of the side frame members to the terminal portions of the side frame pieces will be detachable so that the side frame members can be removed at the desired time. It will be appreciated that many mechanical fastening systems (such as e.g. hook-and-loop), and even some adhesive systems (e.g. that rely on pressure-sensitive adhesives that are repositionable) can allow such an arrangement.

As another example (not depicted), one or more regions of pressure-sensitive adhesive may be disposed on the inward surface of areas of upstream and/or downstream flanges of terminal portions of a side frame member. After the side frame members are fitted onto the corrugated edges of the filter media assembly, these areas of the flanges of the side frame pieces may be adhesively bonded to areas of the upstream and downstream flanges of terminal portions of end frame members with which they overlap. In some embodiments, if such adhesives are present, they may be covered by release liner to ensure that the side frame pieces do not become attached to the end frame pieces during the time before formation of the frame.

Similar arrangements may be done using mechanical fasteners rather than adhesives. Such an approach may use e.g. so-called hook and loop fasteners. For example, designated areas of upstream and downstream flanges of side frame members may comprise patches of loop material, with similar areas of end frame members comprising patches of hook material (or vice versa). Other types of mechanical fastening systems (e.g. the products available from 3M Company under the trade designation DUAL-LOCK) may be used.

The above discussions have primarily concerned attaching side frame members 132, 134 to end frame members 32, 34 at the corners of the pleated air filter media assembly 30, to form a robust perimeter frame 90 that imparts the thus-formed air filter 20 with adequate mechanical strength. In some embodiments, it may be advantageous to arrange each side frame member so that the corrugated edge 50a of the pleated filter media assembly 30 is in intimate, occlusive contact with the inward surface of the outer sidewall 35 of the side frame piece. This may minimize or prevent any air leaks around the corrugated edges of the pleated air filter media assembly 30. Thus, for example, the inward surface of the sidewall may comprise a sealing layer e.g. in the form of an adhesive coating so that the corrugated edge of the pleated filter media bonds thereto upon contact with the adhesive. Or, the inward surface of the sidewall may comprise a sealing layer in the form of a thin strip of resiliently compressible gasket material such as foam rubber or the like so that occlusive sealing is achieved primarily by mechanical pressure rather than by adhesive means. Any combination of such approaches may be used. Such approaches may be summarized as providing a sealing layer along some or essentially all of the elongate length of the inward surface of the outer sidewall of the side frame piece, regardless of whether the sealing layer operates by way of providing a compressible, resilient gasket, an adhesive interaction, or some combination of both. Whatever the particular arrangement, the sealing layer will be configured to be occlusively contacted by the corrugated edge of the pleated air filter media (with terms such as occlude, occlusive, occlusively, and similar terms, indicating that air leaks are minimized or prevented).

Figure 13:
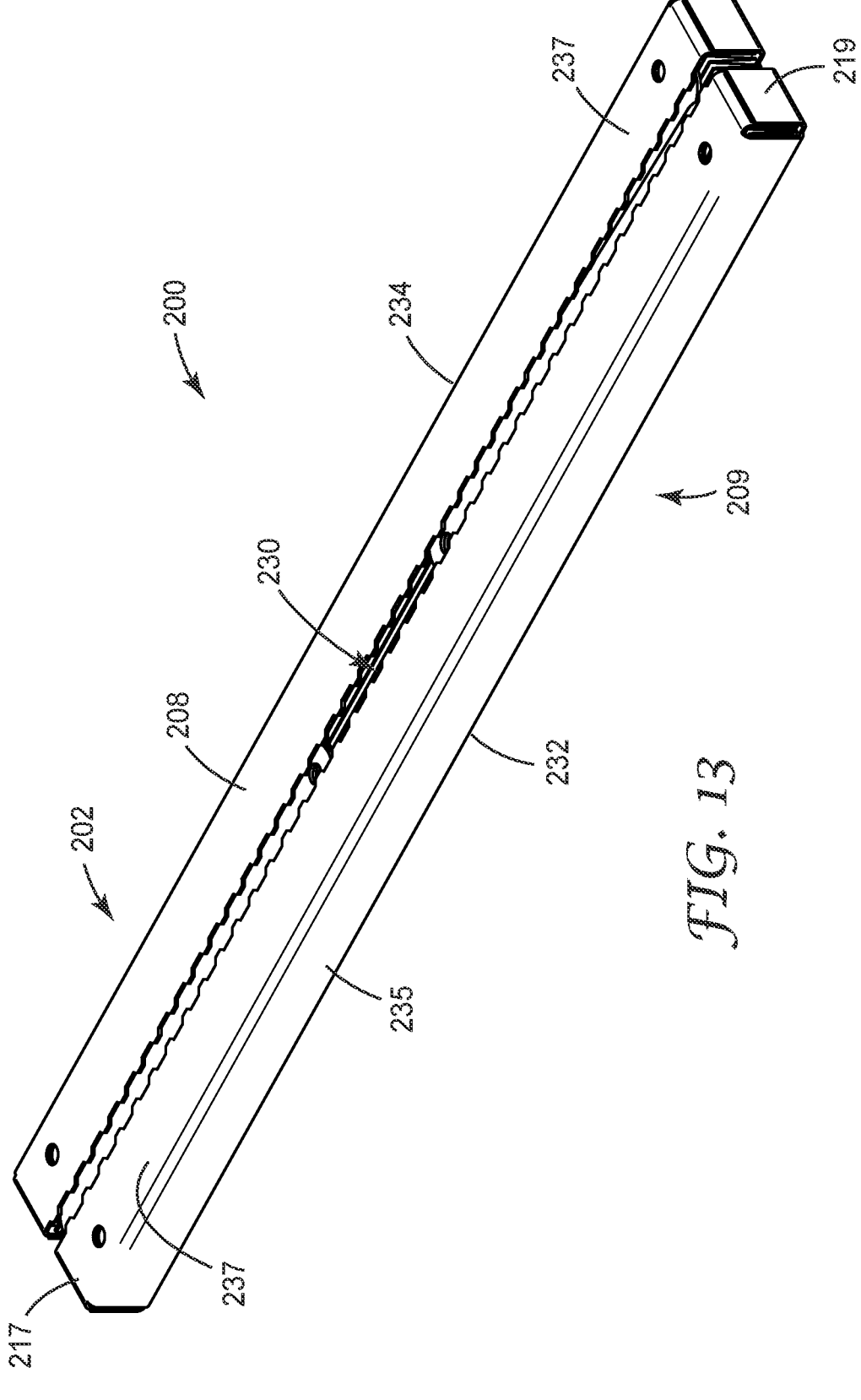
FIG. 13 is a perspective view of a container for shipping and displaying the air filters of the present disclosure.
Figure 14:
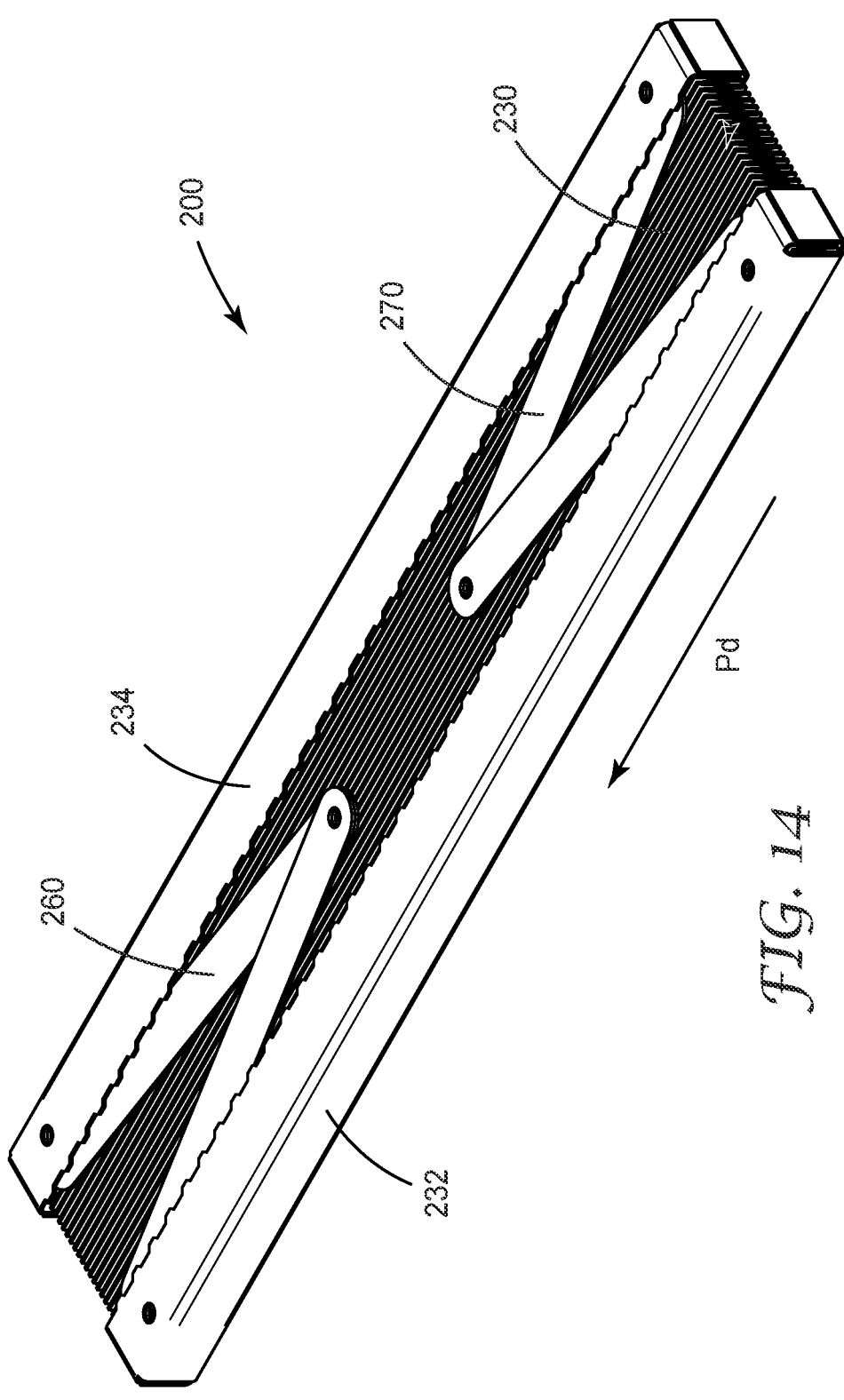
FIG. 14 is a perspective view of the container of FIG. 13, opened to reveal an air filter of FIG. 1 in a partially expanded state.

Another air filter and packaging assembly according to embodiments of the present disclosure is depicted in FIGS. 13 and 14. The filter 200 has a container 202 including initially connected end frame members that can be separated to allow for air filter expansion. Accordingly, the air filter 200 includes a packaged state and an unpackaged state. In the packaged state shown in FIG. 13, the container 202 includes opposing top 208 and bottom faces 209 and opposing side faces 210, 211 disposed in generally orthogonal orientation to the top and bottom faces 208, 209. The container 202 further includes opposing ends 217, 218. With exception of the distinctions explained below, container 202 is similar to container 100 and the considerations related to like elements apply mutatis mutandis to container 202.

Both the top and bottom faces 208, 209, as well as the opposing ends 217, 218, of the container 202 include a central section that is separable from the container along parallel, friable connections that allow access to the air filter assembly 230 within. That is, the parallel, friable connections extend about the entire perimeter of the container 202. As depicted in FIG. 13, the central section has been removed entirely, leaving opposing, generally U-shaped frame members 232, 234 that include an outer end wall 235, and upstream (237) and downstream (not shown) flanges that each extend inwardly and opposed to one another. The generally U-shaped frame member 232, 234 act as end frame members, running the length of the pleat direction (Pd) of the air filter assembly 230 (see FIG. 14).

When the user is ready to install the air filter 200 to an HVAC system, the user simply separates the end frame members 232, 234 from one another along the friable connections on the container 202 faces 208, 209, 217, 218. The user then pulls on the two end members 232, 234 to stretch the pleated filter media assembly 230 to a desired size corresponding with the filter receiving housing or bay of the HVAC system. FIG. 14 depicts the pleated filter media assembly in a partially expanded, unpackaged state. The shape retention structures 260, 270, like structures pivotable structures 60 and 70, are configured to allow desired stretching of the pleated filter media assembly 230. Once the air filter 200 has been stretched to the desired size (e.g., desired length), the shape retention structures 260, 270 secure and hold the pleated filter media assembly 230 to the selected size.

The patents, patent documents, and patent applications cited herein are incorporated by reference in their entirety as if each were individually incorporated by reference. Although specific embodiments of the present disclosure have been shown and described herein, it is understood that these embodiments are merely illustrative of the many possible specific arrangements that can be devised in application of the principles of the present disclosure. Numerous and varied other arrangements can be devised in accordance with these principles by those of ordinary skill in the art without departing from the spirit and scope of the present disclosure. Thus, the scope of the present disclosure should not be limited to the structures described in this application, but only by the structures described by the language of the claims and the equivalents of those structures.

What is claimed is:

1. A packaged air filter, comprising:
   a container having opposed top and bottom faces, wherein at least the top face includes a friable connection allowing for removal of a portion of the top face;
   a collapsed, pleated air filter media assembly within the container, the filter media assembly exhibiting a pleat direction and is expandable to an expanded state along an expanding-contracting direction that is orthogonal to the pleat direction, the pleated air filter media assembly comprising first and second opposing ends and first and second opposing corrugated edges; wherein a spacing distance between adjacent pleats in the filter media assembly is greater in the expanded state of the air filter than in a collapsed state of the air filter, a first end frame member that is attached to the first end of the pleated air filter media assembly and a second end frame member that is attached to the second end of the pleated air filter media assembly; and
   wherein opening the container along the friable connection creates a pair of side frame members, wherein a first side frame member is configured to be mounted on the first corrugated edge of the pleated air filter media assembly when the pleated air filter media assembly is in an expanded configuration and wherein a second side frame member is configured to be mounted on the second corrugated edge of the pleated air filter media assembly when the pleated air filter media assembly is in the expanded configuration.

2. The packaged air filter of claim 1, wherein terminal portions of the first and second side frame members are configured to be attached to terminal portions of the first and second end frame members so that the first and second side frame members and the first and second end frame pieces collectively form a perimeter support frame for the pleated air filter media assembly when the pleated air filter media assembly is in the expanded configuration.

3. The packaged air filter of claim 1, wherein the first and second side frame members each exhibit a general U-shape when viewed along a long axis of the side frame piece.

4. The packaged filter of claim 1, wherein the air filter assembly includes a shape retention structure capable of being connected to at least a portion of the filter media assembly and capable of retaining the filter media assembly in the expanded state.

5. The packaged air filter of claim 1, wherein the filter media is a nonwoven fibrous media.

6. The packaged air filter of claim 5, wherein the nonwoven fibrous media includes at least one of thermoplastics, thermosetting materials, polyesters, polyamides, natural fibers, acrylic fibers, olefin copolymers, PTFE, polyurethanes, polyvinyl chloride, porous foam, a nonwoven material, paper, fiberglass, and combinations thereof.

7. The packaged air filter of claim 5, wherein the thermoplastic or thermosetting materials are selected from a group consisting essentially of polypropylene, HDPE, LDPE, LLDPE, and metallocene polyolefins.

8. The packaged air filter of claim 1, further comprising:
   at least one of a wire mesh, a scrim, a screen, and/or one or more adhesive strands adjacent to the filter media.

9. The packaged air filter of claim 1, wherein the filter media has an electrostatic charge.

10. The packaged air filter of claim 1, wherein the filter media lacks an electrostatic charge.

11. The packaged air filter of claim 4, wherein the shape retention structure includes first and second arms wherein the first arm is pivotably coupled to the first end member and the second arm is pivotably connected to the second end member and the first and second arms are pivotably connected to one another.

12. The air filter assembly of claim 11, further comprising:
   an attachment mechanism capable of attaching at least one of the first and second arms to the filter media.

13. The air filter assembly of claim 4, comprising two or more shape retention members.

14. The package air filter of claim 1, wherein each of the first and second side frame members has a terminal portion that is configured so that a terminal end of the end frame members is attachable to a terminal portion of a side frame member which the terminal portion of the side frame piece meets to form a corner of the perimeter support frame and/or is configured so that a the terminal portion of the side frame member is attachable to a terminal portion of the end frame piece which the terminal portion of the side frame piece meets to form the corner of the perimeter support frame.

15. The packaged air filter of claim 1, wherein the expanded state of the air filter corresponds with an expected size of a filter receiving housing or bay of an HVAC system.

16. A framed air filter formed from the air filter of claim 1, the framed air filter comprising the pleated air filter media assembly in the expanded configuration and having a perimeter support frame comprising the first and second side frame members respectively mounted on first and second corrugated edges of the pleated air filter media assembly and with terminal portions of the first and second side frame members attached to terminal portions of the first and second end frame members.

17. A method of filtering air in a powered air-handling system, the method comprising:

installing the framed air filter of claim 16 into a receptacle of a power air-handling system; and, allowing air to flow through the pleated filter media assembly of the framed air filter.

18. A method of using an air filter of claim 17, comprising:

pulling on the two end frame members to stretch the pleated filter media assembly the expanded state.

19. A method of unpackaging a collapsed, pleated air filter media assembly from a container having opposed top and bottom faces, wherein both the top and bottom faces include a friable connection allowing for removal of a portion of the respective face, the method comprising:

removing a portion of the top and bottom faces at the friable connection to create two side frame members;

expanding the collapsed pleated air filter media assembly to a span that matches an elongate length of the first and second side frame members; and mounting the first side frame member on a first corrugated edge of the pleated air filter media assembly and mounting the second side frame piece on a second corrugated edge of the pleated air filter media.

\* \* \* \* \*